UNITED STATES PATENT OFFICE.

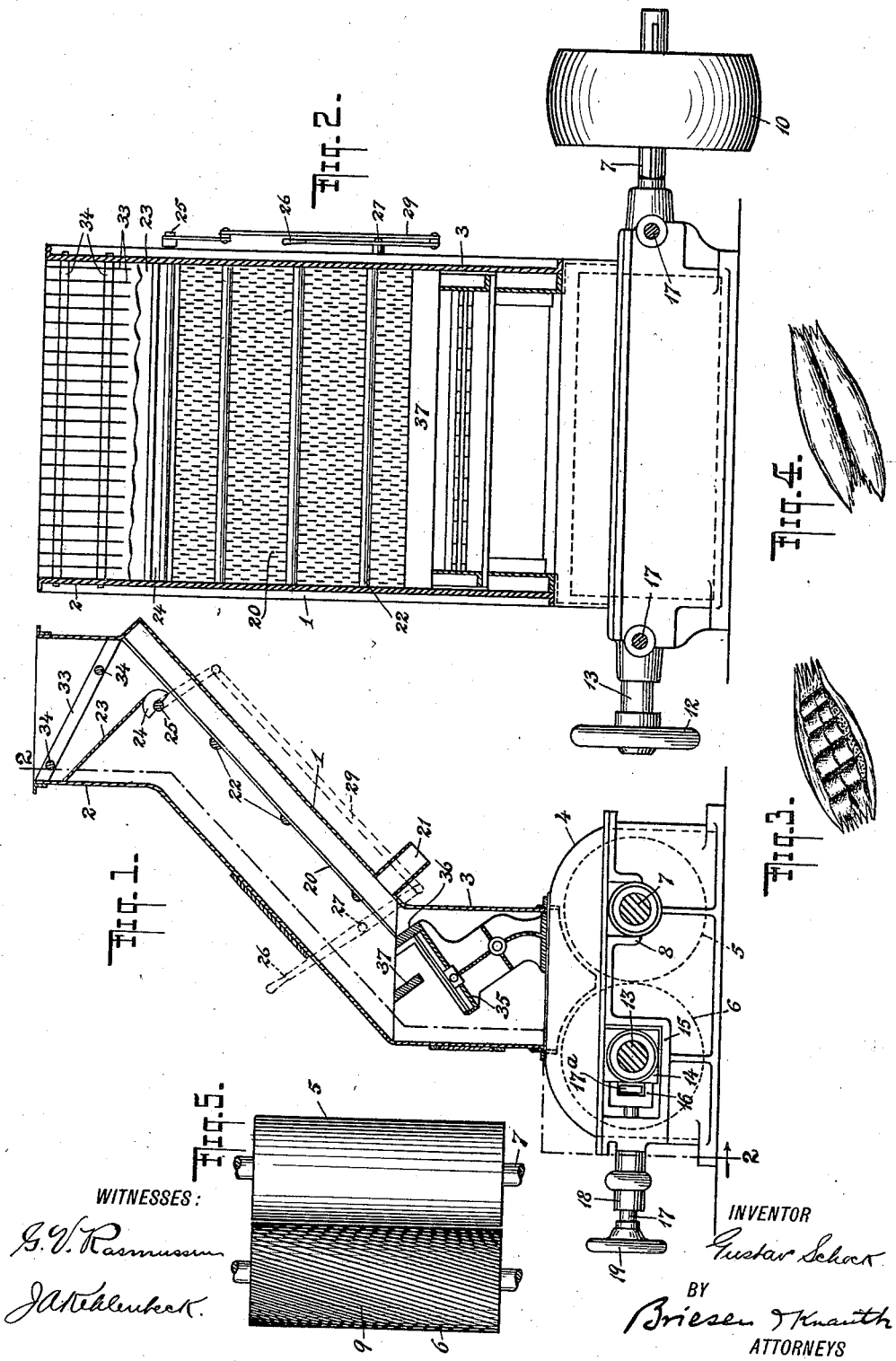

GUSTAV SCHOCK, OF NEW YORK, N. Y.

FOOD PRODUCT.

1,014,099.  Specification of Letters Patent.  Patented Jan. 9, 1912.

Application filed April 1, 1910. Serial No. 552,792.

*To all whom it may concern:*

Be it known that I, GUSTAV SCHOCK, a citizen of the United States, and resident of the borough of Manhattan, city, county, and State of New York, have invented certain new and useful Improvements in Food Products, of which the following is a specification.

My invention relates to food products and more particulary to oats or similar products in which the nutritious food element is inclosed in a tough and indigestible covering or husk and has for its object to prepare such food products, before using, in such a manner as to expose the nutritious element to the ready action of the gastric juices without however disintegrating or comminuting said food elements and without removing same from the husks or covering. Heretofore particularly in animal foods of the above kind if the products in the natural state are fed to the animal only a very small percentage thereof is properly assimilated and consequently only a small amount of nourishment obtained in proportion to the amount of food consumed, the remainder being expelled practically in the original state after acting destructively upon the digestive organs. If on the other hand, the said products are smashed or so ground up that the husks are separated from the kernel, the kernel is reduced largely to powder of which a large proportion is lost in transport or during consumption.

The particular object of my invention is to overcome these objections and to retain the husk or covering as a protector for the food element without crushing the kernel while at the same time exposing and treating such element in a manner to make it easily susceptible in its entirety to the digestive organisms.

My invention will be fully described hereinafter and the features of novelty will be pointed out in the appended claims.

Reference is to be had to the accompanying drawings in which—

Figure 1 is a cross sectional view of my improved machine; Fig. 2 is a longitudinal section thereof on the line 2—2 of Fig. 1; Figs. 3 and 4 are perspective views of an oat after it has passed through said machine; and Fig. 5 is a detail view of the crushing rollers.

The machine used in preparing oats or analogous food products according to my invention comprises an inclined chute 1 terminating at its upper end in an upright hopper 2. At its lower end the said chute 1 communicates, through the medium of a chamber 3 with a roller chamber 4 in which the crushing rollers 5 and 6 are located. The roller 5 is carried by a shaft 7 journaled in suitable bearings 8 secured in proper position on opposite walls of the chamber 4 and is preferably provided with a smooth outer surface or periphery. The shaft 7 extends beyond the opposite bearings 8 and carries at one end a belt pulley 10 for the accommodation of a driving belt. The roller 6 has its outer or working surface or periphery preferably formed with grooves or corrugations 9 which extend from one end of said roller to the other in a direction at an angle to its axis, and is mounted on a shaft 13 the opposite ends of which are journaled in bearing blocks 14 and carrying at its one end a hand wheel 12. The bearing blocks 14 are each slidably mounted in guides 15 secured to or forming part of the walls of the chamber 4 and are each provided with sockets 16 in which the ends of adjusting screws 17 are rotatably mounted. These adjusting screws 17 pass through and are in screw threaded engagement with stationary sleeves 18 and carry at their free ends the hand wheels 19. It is to be understood that said screws 17 are each rotatable relatively to the sockets 16 but are held against lengthwise movement relatively thereto by means of enlargements or collars 17$^a$ secured to the inner end of each screw. Thus by rotating the hand wheels 19 in one direction or the other the screws 17 are correspondingly rotated and the blocks 14 moved lengthwise of the guides 15 to adjust the roller 6 toward or away from the roller 5.

A screen or sieve 20 is located in the chute 1 and extends lengthwise thereof at a distance from and parallel with the lower wall of said chute which is provided near its outlet at a point beneath said screen with an outlet 21. Projections 22 extend completely across the upper face of said screen at intervals for the reasons to be more fully brought out hereinafter. An inclined platform 23 is secured in position in the hopper with its lower or free end spaced from the upper surface of said screen which extends for a distance beyond the point where said platform is located. A valve 24 secured to a shaft 25 suitably journaled in the side walls of the machine normally closes the space between the free end of the platform 23 and the upper surface of the screen 20 and in this position serves to cut off communication between the hopper 2 and the chute 1 at this point. This valve 24 may be operated through the medium of a lever 26 pivoted at 27 on the chute 1 and pivotally connected by means of a link 29 with an arm 30 secured to one end of the shaft 25. Thus by swinging the lever 26 on its pivot the valve 24 may be caused to rock about its axis to an open or closed position. A series of inclined parallel blades 33 are mounted on rods 34 in the hopper 2 adjacent to the mouth thereof, and form a grating extending over the entire width of the said hopper for the retention of sticks and other coarse, foreign articles to prevent clogging of the machine.

35 is a magnet located in the chamber 3 and extending substantially across the said chamber the surface of said magnet being inclined at substantially the same angle as the screen 20. Parallel partitions 36 and 37 are secured in said chamber in close proximity to said magnet the partition 36 being mounted in position at the lower end of the screen 20 while the partition 37 is secured at a distance therefrom and with its lower edge spaced from the magnet 35. These two partitions form a passage or channel through which the material passes from the screen to the magnet so as to be distributed in a thin layer as it passes over said magnet the purpose of which will be brought out more fully hereinafter.

In operation, the oats or analogous food products are introduced into the hopper 2 and pass through the spaces between adjacent blades 33 to the inclined platform 23 and valve 24. By swinging the free end of the lever 26 as before stated the valve 24 will be opened thus permitting the oats or other food products to pass through the space between the end of the platform 23 and the screen 20 and along the upper surface of said screen. During its travel along said screen all dust and dirt will drop through the meshes of the screen to the lower wall of the chute 6 and finally out through the outlet 21. The speed of the oats during their travel over the screen 20 is retained by means of the spaced projections 22 so that this screening process just described is very thorough and all the dust and dirt is removed therefrom. From the screen 20 the oats pass through the passage formed by the partitions 36 and 37 to the magnet 35 which attracts any metallic atoms, nails, screws or similar foreign matter which may have become mixed with the oats and maintains them on its surface against entrance to the roller chamber 4. The partition 37 is so located that its lower edge is in rather close proximity to the magnet so that the oats or other food must pass through this space in a thin shallow layer. Every part or portion of said food is thus subjected to the influence of the magnet which as before stated will attract any nails, screws, etc., and will prevent same from passing between the crushing rollers 5 and 6. The surfaces of these rollers are thus protected against injury.

From the magnet the food free and clear of any foreign matter passes to and between the crushing rollers to a suitable receptacle. In passing between the rollers 5 and 6 the pressure is just sufficient to split and open the husk or covering of the oat without, however, grinding the grain or kernel or in fact completely separating said grain and husk. As the husk is thus split the grain or kernel is exposed and is scored by means of the separations 9 of the roller 5 as clearly shown in Fig. 3. This scoring of the grain or kernel serves to soften it slightly and to render it more readily susceptible to the action of the digestive organism. That is, these scorings substantially divide the said kernel or grain into a number of small sections which become easily separated after having been swallowed so that even if an animal should neglect to chew said food sufficiently the gastric action will separate the kernel from the husk and bring about complete assimilation of the food contents of the oats. Furthermore, the serrated surface of the one roller prevents the oats from being completely smashed as would be the case if two smooth rollers or two corrugated rollers were provided in close engagement with each other. Thus after the oat has been passed through my improved machine the nutritious food element is exposed so as to be readily reached and assimilated by the gastric juices without being completely ground up, smashed or separated from its protecting husk or covering. The maximum amount of nutrition is, therefore, secured from any given amount of oats or similar food treated according to my invention, so that a smaller amount may be used as a meal than heretofore without sacrificing any of the benefits of the larger amount of food served in its natural condition, only a small percentage of which actually provided any nourishment owing to the fact that the husks are unopened and are proof against the action of digestive fluids or juices. It is well known that a horse, for instance, in chewing oats fed in the natural condition succeeds in opening only a comparatively few husks and swallows the greater part of each measure with the oats in the same condition as when fed to it. These unchewed and unopened oats are expelled without having supplied any nourishment whatever and ofttimes are the cause of disorders of the stomach and digestive organs. Oats or similar foods treated according to my invention avoid all such troubles and as before stated supply a maximum amount of nourishment even if swallowed without chewing. The hand wheel 12 is for the manual operation of the rollers 5 and 6 for any purpose or to start said rollers in rotation should they become clogged from any cause.

I claim as my invention:

1. Oats in the form of slightly compressed opened husks containing the kernel, each portion of oats being essentially free from closed husks, from husks separated from kernels, from kernels separated from husks, and from pulverulent particles of oats.

2. Oats in the form of slightly compressed opened husks and containing the kernel, each portion of oats being essentially free from closed husks, from husks separated from kernels, from kernels separated from husks, and from pulverulent particles of oats, the kernels within said husks being scored.

3. Oats in the form of slightly compressed opened husks and containing the kernel, each portion of oats being essentially free from closed husks, from husks separated from kernels, from kernels separated from husks, and from pulverulent particles of oats, the kernels being retained within the husks and united therewith by means of scorings pressing the kernel and husk together along the scoring lines.

4. An oat in the form of a slightly compressed husk opened into connected sections, and containing the complete kernel.

5. An oat in the form of a slightly compressed husk opened into connected sections and containing the complete kernel, said kernel being scored.

6. An oat in the form of a slightly compressed husk opened into connected sections, and containing the kernel, said kernel being retained within the husk and united therewith by means of scorings pressing the kernel and husk together along the scoring lines.

In testimony whereof I have signed this specification in the presence of two subscribing witnesses.

GUSTAV SCHOCK.

Witnesses:
JOHN A. KEHLENBECK,
FRITZ ZIEGLER, Jr.

---

Copies of this patent may be obtained for five cents each, by addressing the "Commissioner of Patents, Washington, D. C."